Figure 1:
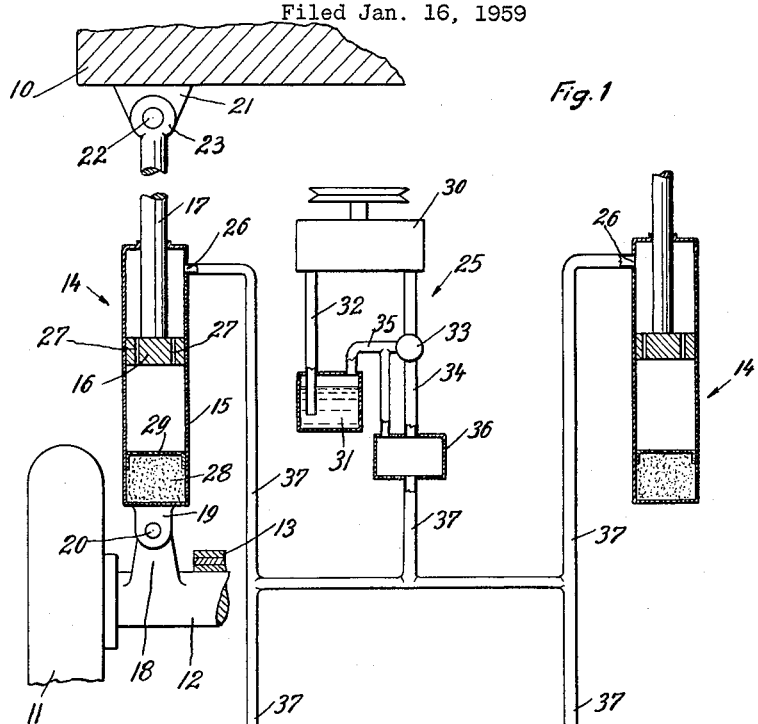

Aug. 28, 1962     E. J. H. FIALA     3,051,507

SHOCK ABSORBER CONTROL SYSTEM FOR A VEHICLE

Filed Jan. 16, 1959

Inventor
ERNST J. H. FIALA
by Dicke, Craig & Freudenberg
ATTORNEYS

United States Patent Office 3,051,507
Patented Aug. 28, 1962

3,051,507
SHOCK ABSORBER CONTROL SYSTEM
FOR A VEHICLE
Ernst J. H. Fiala, Sindelfingen, Kreis Boblingen, Germany, assignor to Daimler-Benz Aktiengesellschaft, Stuttgart-Unterturkheim, Germany
Filed Jan. 16, 1959, Ser. No. 787,200
Claims priority, application Germany Jan. 18, 1958
6 Claims. (Cl. 280—124)

My invention relates to a shock absorber control system for vehicles, more particularly of motor vehicles. When the load imposed on the body of a vehicle is increased, the consequent increase of the flexure of the springs will lower the body and will thus reduce the road clearance. As such reduction is undesirable, means have been provided for maintaining the body substantially at a selected elevational position irrespective of changes of the load imposed on said body. Heretofore, such means involved mechanism for changing the bias of the vehicle springs automatically in response to a tendency of the elevational position of the body to change.

It is the primary object of my invention to provide improved means for maintaining the body of the vehicle substantially at a selected elevational position so as to maintain the road clearance constant irrespective of changes of the load imposed upon the body without necessitating any change of the bias of the springs.

More particularly it is an object of my invention to provide an improved control system for the hydraulic shock absorbers of the vehicle, whereby the road clearance is maintained constant irrespective of changes of the load. It is a further object of my invention to provide an improved control system for shock absorbers of a vehicle which will replenish the liquid filling of the shock absorbers in event of any leakage thereof.

It is another object of my invention to provide an improved control system for the hydraulic shock absorbers of a vehicle which is simple in design and reliable in operation.

Further objects of my invention will appear from the detailed description of a preferred embodiment of my invention following hereinafter with reference to the drawings. I wish it to be understood, however, that my invention is in no way limited to the details of such embodiment but is capable of numerous modifications within the scope of the appended claims and that the terms and phrases used in such detailed description have been chosen for the purpose of explaining the invention rather than that of restricting or limiting same.

Figure 2:
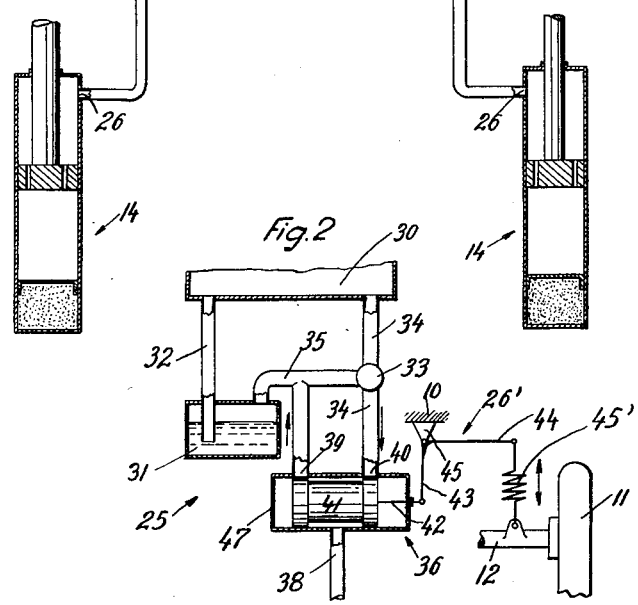

In the drawing:

FIG. 1 is a diagrammatic representation of my improved control system including four shock absorbers individually coordinated to the wheels of a motor vehicle, and FIG. 2 is an illustration on a larger scale of a detail shown in FIG. 1.

The body 10 of a vehicle, for instance a motor-car, is supported by and mounted on four wheels 11 for relative up and down springing movement. The wheel 11 is shown as being carried by an axle 12 on which the body 10 is supported by a semi-elliptical leaf-spring 13.

Moreover, the vehicle is equipped with hydraulic shock absorbers 14 which are individually coordinated to the wheels 11. Each shock absorber 14 is composed of a cylinder element 15 and of a piston 16 slidably guided in the cylinder element 15 and provided with a piston rod element 17 which extends out of the cylinder element 15. One of the elements 15 and 17 is connected to the associated one of the wheels 11, for instance through the intermediary of the axle 12, a bracket 18 fixed thereto, an eye 19 fixed to the bottom of the cylinder 15 and a pivot pin 20 connecting the eye to the bracket 18. The other element 17 of the shock absorber is pivotally connected to the body 10, for instance by means of a bracket 21 fixed to the latter and a pivot pin 22 extending through an eye 23 of the piston rod element 17. Owing to this connection of the shock absorber to the body 10 and the wheel 11, the springing movement of the wheel will produce a relative reciprocation of the cylinder 15 and the piston 16.

For the purpose of maintaining the body 10 substantially at a selected elevational position irrespective of changes of the load imposed on the body without necessitating any change of the bias of the spring 13, I have provided a control system for the shock absorbers 14 which will now be described.

This control system comprises pressure producing means 25 illustrated in FIG. 2 on an enlarged scale which are connected to each shock absorber by suitable conduits diagrammatically shown as comprising pipes leading to a port 26 provided in the wall of the cylinder 15 near the top thereof. Moreover, I have provided means 26' which are connected with the body 10 and with at least one of the wheels 11 and are responsive to variations of the elevational body position relative to the wheels or, in other words, of the road clearance. These means 26' control the pressure producing means 25 to maintain the cylinder element 15 under a variable pressure causing the shock absorber 14 to maintain the body substantially at a selected elevational position even though the load imposed on the body may change. Thus, when passengers enter the vehicle and thus weigh down the body 10, the means 26' connected with the body 10 and with at least one of the wheels 11 will respond thereto and will cause the pressure producing means 25 to feed liquid under pressure into ports 26, thereby increasing the pressure prevailing in the liquid contained in the cylinders 15. As the area of the bottom face of the piston 16 acted upon by this pressure is larger than the area of the annular top face of the piston 16 surrounding the piston rod 17, the pressure of the liquid tends to lift the piston 16 and the piston rod 17 with a force which, if properly controlled, may carry the passengers and may thus keep the body 10 on the same level as before. Hence, by properly controlling the pressure of the liquid acting on the ports 26 of the shock absorbers 14 I may keep the road clearance of the body constant irrespective of variations of the load.

Each of the shock absorbers 14 is provided with a restricted passage-way by-passing the piston 16 and thus establishing communication of the annular upper chamber in cylinder 15 with the lower chamber thereof. In the embodiment shown in FIG. 1 this restricted passage-way is constituted by a pair of bores 27 extending through the piston 16.

As the volume of the liquid filling of the shock absorbers is changed by the relative reciprocation of the shock absorber elements 15 and 17, suitable means must be provided which will afford such a change. In the embodiment shown a gas-filled cushion means is associated with each shock absorber. More particularly, this gas-filled cushion means is formed by an expandable gas-filled chamber 28 disposed within the cylinder element 15. For this purpose, a piston 29 is freely slidably guided between the piston 16 and the bottom of the cylinder 15 and the space between such bottom and the piston 29 is filled with a suitable gaseous medium, such as compressed air.

The port 26 is so restricted that its provision does not materially affect the shock absorbing function of the device 14 during the travel of the vehicle in the course of the springing movements of the wheels 11, as such springing movements occur in comparatively quick succession lasting but short periods of time having too short a duration to permit appreciable quantities of liquid to pass through the ports 26. Any change of the load of the body 10, however, is effective over much larger periods of time during which the pressure producing means now to be described cause so much liquid to pass through the ports 26 as to insure the afore described balancing effect which will maintain the average road clearance constant.

The pressure producing means 25 includes a pump 30, a liquid reservoir 31 communicating with the suction pipe 32 of the pump, a relief valve 33 inserted in the pressure pipe 34 of the pump and capable of discharging a surplus of liquid fed by the pump through a return pipe 35 to the reservoir 31. Moreover, the pressure producing means 25 includes a control valve 36 capable of controlling the pressure prevailing in communicating pipes 37 which connect each of the ports 26 of the shock absorbers 14 to the control valve 36.

The control valve 36 which is shown in detail in FIG. 2 includes a cylindrical housing 47 having a central port 38 communicating with the pipes 37 and lateral ports 39 and 40. The port 39 communicates with the exhaust conduit 35, whereas the port 40 communicates with the pressure conduit 34. A plunger 41 slidably guided in the cylindrical housing 47 has a circumferential recess permanently communicating with the port 38 and adapted by the plunger to be alternatively put into communication either with port 39 or with port 40. In a central position of the plunger 41, as shown in FIG. 2, both ports 39 and 40 are closed.

The plunger 41 has a shaft 42 extending out of the housing 47 through a suitable packing. This shaft is suitably connected with one arm 43 of a bell crank having another arm 44 and being fulcrumed to a bracket 45 fixed to the body 10 of the vehicle. The end of the arm 44 is connected with the axle 12 of one of the wheels 11 by a resilient link 45. Therefore, any change of the flexure of the spring 13 associated with the wheel 11 of FIG. 2 caused by a change of the load results in an angular displacement of the bell crank 43, 44 and in a consequent displacement of the plunger 41 in the valve housing 47 so as to change the pressure prevailing in port 38. When the plunger 41 assumes its central position as shown in FIG. 2, both ports 39 and 40 being closed, no liquid will pass through the conduits 37 to or from the ports 26. When the plunger moves towards the left with reference to FIG. 2, however, the pipe 37 will be put on exhaust, whereas a displacement of plunger 41 towards the right causes the pipe 37 to be fed with liquid under pressure.

As the load imposed on the front wheels is normally smaller than that imposed on the rear wheels of the vehicle, I prefer to dimension the diameter of the piston rods 17 associated with the front wheels larger than the diameter of the piston rods 17 associated with the rear wheels of the vehicle. This is particularly important where the pressure producing means 25 is common to all of the shock absorbers 14, as in the embodiment described hereinabove. As a result, the effective piston area of the shock absorbers associated with the front wheels will be smaller than the effective piston area of the shock absorbers associated with the rear wheels, the relationship corresponding to the load distribution with respect to the front wheels and the rear wheels.

The operation of my improved system is as follows. When the load imposed on the body 10 is increased, the flexure of the springs 13 will be increased so as to lower the body. As a result, the pistons 16 of the shock absorbers 14 are displaced in downward direction and, similarly, the bell crank 43, 44 will swing anti-clockwise moving the plunger 41 towards the right and permitting oil under pressure to flow from the pressure conduit 34 through the ports 40 and 38 and the pipes 37 and the ports 26 into the upper cylinder chambers of the shock absorbers 14 and thence through the passage-ways 27 to the lower chambers of the shock absorber cylinders. As a result, the pistons 16 and piston rods 17 will be gradually raised until the selected road clearance of the vehicle will have been re-established and the bell crank 43, 44 will have returned to its normal position shown in FIG. 2 in which the valve 36 closes the conduits 37.

When the body 10 of the vehicle is relieved of a load, the springs 13 will lift the body 10 to a certain extent causing the bell crank 43, 44 to swing clockwise. Consequently, the valve plunger 41 will establish a communication of the conduits 37 with the exhaust port 39 permitting the pistons 29 acted upon by the compressed gaseous medium in chambers 28 to discharge liquid from the shock absorbers. Consequently, the pressures prevailing in the gas-filled cushion chambers 28 will decrease. Since the pressure prevailing in the liquid above and below the piston 16 equals that prevailing in the chamber 28, the pressures acting upon the piston 16 will decrease accordingly permitting the body of the vehicle to descend until the bell crank 43, 44 has returned to its normal position shown in FIG. 2 in which the conduits 37 are closed.

From the above it will be appreciated that the elevational position of the body 10 of the vehicle desired at any time is attained by varying the pressure prevailing in the shock absorbers, such pressure exerting a variable supporting force on the body due to the effective cross-section of the shock absorber piston which depends on the area of the cross-section of the piston rod. As the supporting forces exerted by the shock absorbers for the maintenance of a constant road clearance are produced by the pressure of the liquid in the shock absorbers, my invention offers the further advantage that the shock absorbers when developing a leak will not become ineffective but will remain in operation because the leakage losses will be replenished by the oil pump 30. The supporting forces exerted upon the body 10 by the shock absorbers of the front wheels are lower than those exerted by the shock absorbers of the rear wheels because of the differences of the diameters of the piston rods 17. Therefore, the same pressure may be maintained in all ports 26 and a single pressure producing means 25 may be coordinated in common to all shock absorbers.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle having a body supported by and mounted on wheels for relative up and down springing movement, the combination comprising hydraulic shock absorbers individually coordinated to the wheels, each shock absorber being composed of a cylinder element and of a piston slidably guided therein and provided with a piston rod element extending out of said cylinder element, one of said elements being connected to the associated one of said wheels and the other element being connected to said body in a manner causing said springing movement to produce relative reciprocation of said elements, said hydraulic shock absorbers coordinated to some of said wheels including piston rod elements having a diameter different than that of the piston rod elements of shock absorbers coordinated to others of said wheels, pressure producing means connected to each shock absorber for maintaining pressure in the cylinder element thereof, and means connected with said body and at least one of said wheels and responsive to variations of the elevational position of said body relative to said wheels and connected with said pressure producing means for controlling the latter to maintain said cylinder element under a variable pressure causing said last mentioned shock absorber to maintain said body substantially at a selected elevational position irrespective of changes of the load imposed on said body.

2. The combination claimed in claim 1 further comprising a plurality of gas-filled cushion means, each operatively connected with one of said shock absorbers.

3. The combination claimed in claim 2 in which each of said gas-filled cushion means is formed by an expandable gas-filled chamber disposed within said cylinder element.

4. The combination claimed in claim 1, in which each said shock absorber includes at least one restricted bore extending through the piston thereof forming a restricted passage-way by-passing said piston.

5. In a motor vehicle having a plurality of front and rear wheels and a vehicle body mounted on and supported by said plurality of wheels for relative up and down springing movement, the combination comprising hydraulic shock absorbers individually coordinated to each of said plurality of wheels, each shock absorber comprising a cylinder element and a piston slidably guided therein, said piston dividing said cylinder element into two chambers each of which is filled with hydraulic fluid, said chambers being interconnected by restricted passage-way means by-passing said piston, said piston including a piston rod element extending out of said cylinder element, one of said cylinder element and said piston rod element being connected to the associated one of said wheels and the other of said elements being connected to said body in a manner causing said springing movement to produce relative reciprocation of said elements, said hydraulic shock absorbers coordinated to some of said wheels including piston rod elements having a diameter different from that of the piston rod elements of shock absorbers coordinated to others of said wheels, the shock absorbers having the larger diameter piston rod elements being coordinated to the wheels at the end of the vehicle normally experiencing the lighter load, and control means for controlling the elevational position of the vehicle body including one source of pressure liquid, one exhaust means, means responsive to variations in the elevational position of said vehicle body relative to said wheels, and conduit means so constructed and arranged to selectively connect simultaneously all of said cylinder elements with one of said pressure source and said exhaust means, said conduit means including valve means actuated by said means responsive to variations in the elevational position in the vehicle body relative to said wheels to simultaneously connect all of said cylinder elements selectively with one of said pressure source and said exhaust means to simultaneously control the pressure in said cylinder elements in a manner causing the latter acting through said piston rod elements to maintain the vehicle body substantially at a selected elevational position relative to said wheels irrespective of changes in the load imposed on said body.

6. The combination as claimed in claim 5, wherein said one source of pressure liquid and one exhaust means are constituted by a pressure-producing means including a pump, a first conduit communicating with the suction side of said pump and containing a liquid reservoir, a second conduit communicating with the pressure side of said pump and containing a relief valve, said first conduit being connected to said second conduit by said relief valve for discharging liquid from said second conduit into said reservoir when the pressure in said second conduit exceeds a predetermined maximum, and wherein said valve means is a normally closed valve connected to said second conduit downstream of said relief valve and to said first conduit downstream of said relief valve, and said conduit means includes a plurality of conduits arranged so as to simultaneously interconnect all of said cylinder elements with each other and to simultaneously interconnect each of said cylinder elements with said normally closed valve.

References Cited in the file of this patent

UNITED STATES PATENTS

| | | |
|---|---|---|
| 1,244,752 | McCrosson | Oct. 30, 1917 |
| 2,812,954 | Lyon | Nov. 12, 1957 |
| 2,836,431 | Brueder | May 27, 1958 |
| 2,843,396 | Lucien | July 15, 1958 |
| 2,904,346 | Herbenar | Sept. 15, 1959 |
| 2,923,557 | Schilling | Feb. 2, 19760 |
| 2,926,023 | Kraus | Feb. 23, 1960 |
| 2,937,034 | Langen | May 17, 1960 |
| 2,938,736 | Brown | May 31, 1960 |

FOREIGN PATENTS

| | | |
|---|---|---|
| 1,119,322 | France | Apr. 3, 1956 |